(12) United States Patent
Wortmann et al.

(10) Patent No.: US 10,443,897 B2
(45) Date of Patent: Oct. 15, 2019

(54) PIPELINE SYSTEM AND DRAINAGE CONTAINER FOR RECEIVING LIQUID FLOWING THROUGH A PIPELINE SYSTEM

(71) Applicant: BASF SE, Ludwigshafen (DE)

(72) Inventors: Jürgen Wortmann, Limburgerhof (DE); Michael Lutz, Speyer (DE); Katharina Kaleta, Heidelberg (DE); Kerstin Schierle-Arndt, Zwingenberg (DE); Stephan Maurer, Neustadt-Gimmeldingen (DE); Michael Ladenberger, Darstein (DE)

(73) Assignee: BASF SE, Ludwigshafen am Rhein (DE)

( * ) Notice: Subject to any disclaimer, the term of this patent is extended or adjusted under 35 U.S.C. 154(b) by 1320 days.

(21) Appl. No.: 14/198,691

(22) Filed: Mar. 6, 2014

(65) Prior Publication Data

US 2014/0182720 A1    Jul. 3, 2014

Related U.S. Application Data

(60) Provisional application No. 61/733,209, filed on Mar. 6, 2013.

(51) Int. Cl.
*F24S 40/60* (2018.01)
*F24S 23/74* (2018.01)
*F24S 23/70* (2018.01)

(52) U.S. Cl.
CPC ............ *F24S 40/60* (2018.05); *F24S 23/74* (2018.05); *F24S 23/80* (2018.05); *Y02E 10/45* (2013.01); *Y10T 137/8593* (2015.04)

(58) Field of Classification Search
CPC ........ F24J 2/463; F24J 2/4632; B08B 9/0325; B08B 9/0328; E03B 7/12; F24S 40/60
USPC ................ 126/588, 598, 655; 134/22.12
See application file for complete search history.

(56) References Cited

U.S. PATENT DOCUMENTS

| | | |
|---|---|---|
| 3,195,627 A | 7/1965 | Goodloe |
| 3,293,407 A | 12/1966 | Ando |
| 3,630,038 A | 12/1971 | Ando |
| 3,968,652 A | 7/1976 | Chevalier |

(Continued)

FOREIGN PATENT DOCUMENTS

| | | |
|---|---|---|
| DE | 859549 C | 12/1952 |
| DE | 1515139 B1 | 2/1970 |

(Continued)

OTHER PUBLICATIONS

DE 4319109 A1—English machine translation.*

*Primary Examiner* — Jorge A Pereiro
(74) *Attorney, Agent, or Firm* — Drinker Biddle & Reath LLP

(57) ABSTRACT

A pipeline system in a linearly concentrating solar power station comprises at least one pipeline which is connected at one end to a converger and at a second end to a distributor. The converger and the distributor are arranged at a different geodetic height. When the converger lies on top pressurized gas can be fed into the converger and the distributor is connected to a drainage container. When the distributor lies on top pressurized gas can be fed into the distributor and the converger is connected to a drainage container. The drainage container is lower than the converter and the distributor.

17 Claims, 6 Drawing Sheets

(56) References Cited

U.S. PATENT DOCUMENTS

| | | | |
|---|---|---|---|
| 3,975,617 A | 8/1976 | Othmer | |
| 3,975,819 A | 8/1976 | Ando | |
| 4,127,103 A | 11/1978 | Klank et al. | |
| 4,147,155 A | 4/1979 | Krafft | |
| 4,190,037 A * | 2/1980 | Niedermeyer | F24J 2/14 126/655 |
| 4,200,148 A | 4/1980 | Friefeld et al. | |
| 4,253,491 A | 3/1981 | Worthen et al. | |
| 4,324,229 A | 4/1982 | Risser | |
| 5,256,844 A | 10/1993 | Grosvik et al. | |
| 5,862,800 A | 1/1999 | Marko | |
| 6,154,608 A | 11/2000 | Rochelle | |
| 6,167,883 B1 | 1/2001 | Beran et al. | |
| 6,246,831 B1 | 6/2001 | Seitz et al. | |
| 6,701,711 B1 | 3/2004 | Litwin | |
| 7,011,086 B2 | 3/2006 | Litwin | |
| 7,260,320 B2 | 8/2007 | Stanzel et al. | |
| 7,932,480 B2 | 4/2011 | Gu et al. | |
| 8,474,446 B1 * | 7/2013 | Rohr | F24J 2/245 126/623 |
| 2002/0122664 A1 | 9/2002 | Mjelstad et al. | |
| 2004/0108099 A1 | 6/2004 | Litwin | |
| 2005/0126560 A1 | 6/2005 | Litwin | |
| 2006/0102806 A1 | 5/2006 | Noseworthy | |
| 2006/0130654 A1 | 6/2006 | King et al. | |
| 2008/0196917 A1 | 8/2008 | Hofmann et al. | |
| 2009/0199557 A1 | 8/2009 | Bennett | |
| 2009/0260359 A1 | 10/2009 | Palkes | |
| 2010/0101564 A1 | 4/2010 | Iannacchione et al. | |
| 2010/0199974 A1 | 8/2010 | Plotkin et al. | |
| 2011/0139144 A1 | 6/2011 | Zheng | |
| 2011/0277470 A1 | 11/2011 | Benyaminy et al. | |

FOREIGN PATENT DOCUMENTS

| | | | |
|---|---|---|---|
| DE | 4319109 A1 * | 12/1994 | F24D 19/0095 |
| DE | 10327493 A1 | 1/2005 | |
| EP | 0085206 A1 * | 8/1983 | B01D 45/08 |
| EP | 1958832 A1 | 8/2008 | |
| EP | 2006593 A1 | 12/2008 | |
| FR | 2722359 A1 | 1/1996 | |
| GB | 2437161 A | 10/2007 | |
| JP | 59153069 A * | 8/1984 | |
| JP | 08-320096 A | 12/1996 | |
| JP | 2008184890 A * | 8/2008 | |
| SU | 540102 A1 | 12/1976 | |
| WO | WO-2006/075913 A1 | 7/2006 | |
| WO | WO-2007/000569 A1 | 1/2007 | |
| WO | WO-2010/052710 A2 | 5/2010 | |
| WO | WO-2012/156472 A1 | 11/2012 | |

* cited by examiner

PIPELINE SYSTEM AND DRAINAGE CONTAINER FOR RECEIVING LIQUID FLOWING THROUGH A PIPELINE SYSTEM

CROSS-REFERENCE TO RELATED APPLICATIONS

This application claims benefit (under 35 USC 119(e)) of U.S. Provisional Application 61/773,209, filed Mar. 6, 2013, which is incorporated by reference.

The invention relates to a pipeline system comprising at least two pipeline loops, which are connected at one end to a converger and at a second end to a distributor.

Pipeline systems which comprise at least two pipeline loops, which are connected at one end to a converger and at a second end to a distributor, are used for example in linearly concentrating solar power stations, in particular Fresnel solar power stations and parabolic trough solar power stations. In this case, a heat transfer liquid suitable for the temperatures occurring in a solar power station flows through the pipeline loops. Suitable heat transfer liquids are, for example, salt melts.

In a linearly concentrating solar power station, the overall pipeline system is generally configured in the form of networks, which are used for the collection of solar energy. To this end, the radiation energy of the sun is concentrated onto receivers by means of parabolic mirrors or Fresnel mirrors. The mirror and receiver combination is referred to as a collector. A row of collectors is connected in series to form so-called solar loops. To this end, the receivers are respectively connected to the pipeline system or constitute a part of the pipeline system. The heat transfer liquid, to which the radiation energy collected by the receivers is transferred, flows through the pipeline system.

At present, a biphenyl/diphenyl ether mixture in particular is used as the heat transfer liquid, although the maximum operating temperature thereof is limited by its decomposition temperature of about 400° C. In order to achieve higher operating temperatures, which allow greater efficiency, other heat transfer liquids are necessary. To this end, salt melts, for example so-called solar salt, which is a mixture of sodium nitrate and potassium nitrate in a ratio of 60:40, are used in particular.

A disadvantage of salt melts is, however, that they have high melting points. A sodium nitrate/potassium nitrate mixture melts, for example, at the eutectic, that is to say with a mixing ratio of 44:56, at a temperature of 218° C. In long pipeline systems, such as are encountered in solar power stations, salt melts with high melting points are difficult to work with reliably. Freezing of the salt melt can cause great economic damage in pipeline systems. One reason for the damage is, for example, the large volume expansion of salts when they melt. There is a risk that valves and pipelines will be placed under pressure and greatly damaged.

When the salt melt freezes, which may essentially happen outside the operating times of the solar power station, that is to say outside the radiation times of the sun or when the solar radiation is interrupted owing to the weather, a volume contraction takes place which can lead to a different solidification state depending on the pipeline system and operating state. It is to be expected that, in general, evacuated bubbles will be created in the pipeline and merge to form more or less sizeable units. When remelting takes place, owing to a possibly large spatial distance between the melting sites with volume expansion and the evacuated regions, there may be insufficient volume compensation to relieve pressures building up.

In order to prevent freezing of the salt melt in the pipeline system, it is customary to drain the pipeline system during prolonged offline times. In the case of current pipeline systems having a storage container for the salt melt, however, the drainage takes a long time and cannot be ensured reliably, in particular for sudden outages, for example in the event of an electrical outage, so that damage to the pipelines can occur especially in such cases.

For the drainage, a drainage container is currently provided, which is installed in a pit and can receive the heat transfer liquid in a container trough when it flows out. The individual solar loops, which are formed by the pipeline system, have a slight gradient of about 0.3% so that, during drainage, the liquid contained in the pipelines is driven in the direction of the drainage container because of the gradient. Owing to better optical efficiency of the collectors, however, it is desirable to operate substantially without gradients.

In previously known solar power stations having a salt melt as the heat transfer medium and with only one drainage container, the slight gradient used is generally inadequate for sufficiently rapid and complete drainage of, in particular, pipeline systems with long pipelines such as are used in solar power stations and which may often have a total pipeline length of more than 100 km. Furthermore, valves and cocks which do not have a safety position are used. Thus, in the event of a power outage, the valves cannot for example put the solar loop into a safe drained state. In this case, freezing of the salt used as a heat transfer liquid is to be considered. The solution of backing up the power supply by a substitute source is not sufficiently secure against all functional problems in the system. Lastly, drainage into a central drainage container entails long flow paths and flow times, with the risk that the heat transfer salt will solidify along the way. Furthermore, a problem in one solar loop can lead to all the solar loops being taken offline.

Currently, salt with a lower melting point is generally used in order to minimize the problems occurring in the pipelines due to the salt melt. Such salt melts, however, have considerable disadvantages. Examples of known heat transfer salts with a lower melting temperature are mixtures of sodium and potassium nitrates and nitrites, and of potassium nitrate, sodium nitrate and calcium nitrate.

Such mixtures, however, have a lower thermal stability than the conventionally used solar salt consisting of potassium nitrate and sodium nitrate, so that the working range is limited to a temperature of less than 500° C. The effect of this is that a lower efficiency of the power station has to be accepted. The salts furthermore have to be kept in closed systems, which leads to additional outlay in the solar field area since inerting systems have to be installed in the solar field. The inerting is necessary because, on the one hand in the case of salts containing nitrite, atmospheric oxygen can oxidize the nitrite into nitrate and the melting point of the salt can therefore rise uncontrolledly, and, in the case of systems containing calcium, carbon dioxide reacts with calcium ions to form insoluble calcium carbonate.

Other alternative salts contain significant amounts of expensive elements that are not readily available, which restricts economic use to systems with low working quantities. Examples of expensive components in these salts are lithium, rubidium and cesium.

Heat transfer systems other than salts generally have a high vapor pressure or entail considerable outlay for the corrosion protection of long pipeline systems.

Systems for heating salt bath reactors are known from the chemical industry, at the lowest point in which there is a drainage tank covered with nitrogen. All control devices in the system are in a safety position, so that in the event of an unintended operating state the molten heat transfer salt, generally a mixture essentially of sodium nitrite and potassium nitrate, flows into the drainage container. To this end, all the pipelines are arranged with a gradient in the direction of the drainage container. The pipelines have such a large diameter that the lines are emptied even if no further venting is provided. Regions incapable of flow, for example above control devices and downpipes, have their own drainage lines via which they can be drained even in the event of valve blockage. The molten heat transfer salt is transported from the drainage containers into the chemical systems with the aid of immersion pumps.

These typical solutions of salt bath reactors, however, are not fully usable and are not sufficient in a solar field owing to its large size. For example, it is not suitable to use one drainage container for a large solar power station since the drainage process would take too long to reliably prevent freezing. Furthermore, the range of the effects of faults in the pipeline system, for example valve malfunctions, needs to be limited. In addition, salt bath reactors are generally operated continuously, that is to say the system runs continuously after start-up of the reactor until the next revision. Until then, the system is constantly hot and flow takes place through all the parts of the system. An attempt is thereby made to avoid obstructions occurring because of solidification of the salt, which could be removed only with great difficulty—if at all. Solar power stations, however, are subjected to a constant cycle of regularly changing operating states. For example, the solar field is not supplied with radiation energy during the night. Continuous hot operation of all the system parts would lead to high radiation losses in the solar field. In order to avoid the high radiation losses, it is therefore expedient to operate the solar power station discontinuously, particularly in order to keep overnight energy losses low.

Furthermore, salt bath reactors and pipeline systems in solar power stations differ in terms of their size. For instance, salt bath reactors conventionally have pipeline lengths of at most a few hundred meters, while the length of the pipelines in solar power stations can exceed 100 kilometers. This also leads to a correspondingly larger amount of salt in the system. Merely owing to their size, therefore, these pipeline systems in solar power stations cannot be operated in a similar way to pipeline systems in, for example, salt bath reactors.

It is therefore an object of the present invention to provide a pipeline system comprising at least two pipeline loops, which can be used in solar power stations and allows reliable drainage during offline times.

The object is achieved by a pipeline system, comprising at least one pipeline which is connected at one end to a converger and at a second end to a distributor, wherein the converger and the distributor are arranged at a different geodetic height, and when the converger lies on top pressurized gas can be fed into the converger and the distributor is connected to a drainage container, and when the distributor lies on top pressurized gas can be fed into the distributor and the converger is connected to a drainage container, the drainage container lying lower than the converger and the distributor.

When a system comprises a multiplicity of pipelines and pipeline loops, for example a solar field of a solar power station, the set of pipelines is divided into a plurality of mutually independent pipeline systems, each of which comprises at least one pipeline which is connected at one end to a converger and at a second end to a distributor. By this division of the set of pipelines of the system, for example the solar field of a solar power station, it is possible to drain one pipeline system while other pipeline systems are unaffected in their function.

It is preferred if the pipeline which is connected at one end to a converger and at a second end to a distributor is designed as a pipeline loop, with the result that the converger and distributor are arranged above one another.

Each of these systems is preferably assigned at least one drainage container, into which draining can be carried out. The drainage containers and their corresponding pipeline systems can be installed at different geodetic heights. As a result, complicated terrain leveling depending on the predefined topography of the terrain can be avoided or minimized. The differences in the geodetic heights of the drainage containers are limited by the permissible pump pressure which feed into the main distributor. A division of the pumping operation into a plurality of stages increase the permissible geodetic height differences of the respective pipeline systems.

Owing to the arrangement of the converger and distributor at a different geodetic height, the liquid contained in the pipeline system flows when drainage is necessary from the upper-lying distributor or converger through the pipelines into the lower-lying converger or distributor, and from there into the drainage container. This process can be assisted by feeding in pressurized gas. By the pressurized gas, the liquid is pressed out of the pipeline system into the drainage container. The liquid thus flows away more rapidly than when it is only driven by the force of gravity. Furthermore, feeding in pressurized gas also makes it possible that the pipelines of the pipeline system can extend almost horizontally. Another advantage of feeding in a pressurized gas is that the length of the pipelines or pipeline loops can be selected to be greater, without putting the drainage capacity of the pipeline system at risk.

In one embodiment of the invention, the donverger and the distributor are respectively configured in the form of a pipeline, and the pipelines respectively branch with one end from the converger and with the other end from the distributor, This configuration makes it possible for a plurality of pipelines to branch from a converger and a distributor.

In a solar power station, each pipeline loop conventionally comprises a plurality of collectors, in which the received sunlight is concentrated onto the salt melt and the salt melt is thereby heated.

It is furthermore preferred for the converger and the distributor to be connected to one another at one end, so that liquid which does not flow from the distributor into a pipeline loop is conveyed at the end of the distributor into the converger. The converger and the distributor therefore likewise form a pipeline loop. This configuration avoids salt melt stagnating at the end of the distributor. The connection of the converger and distributor may in this case also be formed by means of a pipeline loop. To this end, the distributor enters at its end into a pipeline loop, which in turn opens at one end into the converger.

It is furthermore possible for two pipeline loops, which are oriented in opposite directions, to branch opposite one another from the distributor. Correspondingly, the opposite pipeline loops in turn open into the converger at opposite positions.

In order to obtain a sufficiently high power of the solar power station, it is furthermore preferred for the pipeline system to comprise a plurality of convergers and distributors, which are respectively connected to a plurality of pipelines or pipeline loops, all the convergers being connected to a main converger and all the distributors being connected to a main distributor. Via the main distributor, the salt melt enters into the distributors, and from there into the pipelines or pipeline loops. In the pipelines or pipeline loops, the salt melt absorbs heat by sunshine and then flows from the pipeline or pipeline loop into the converger, and from the converger into the main converger. It is preferred, in order to drain one or more pipeline systems, for the access of the at least one pipeline system to be drained to the main converger and main distributor to be closed, for example by inlet valves and outlet valves in the converger and distributor in the region of the branching of the converger and distributor from the main converger and main distributor.

In order to be able to use the heat even at times without solar thermal insolation or with reduced solar thermal insolation, storage systems in which the heated hot salt melt is stored in a hot region are preferably provided. At times without solar thermal insolation, steam is generated with the stored hot salt melt which in turn drives a generator for electricity generation. After the steam generation and the associated cooling of the salt melt, the salt melt is fed back into a colder region of the storage system. When there is sufficient solar insolation, the heated hot salt melt can be used directly to obtain electrical energy. Surplus heat in the form of hot salt melt can be stored in the hot region of the storage system.

The drainage containers, into which the liquid is fed when draining the pipeline system, are preferably positioned in the vicinity of the main convergers and main distributors, respectively between the main converger when the distributor lies on top, or the main distributor when the converger lies on top, and the first pipeline branching from the converger or distributor, respectively. Here, "in the vicinity" means that the drainage containers are positioned as close as possible in terms of installation technology to the branching of the distributor and converger at the main distributor or main converger, respectively. By virtue of this positioning, each pipeline system, which comprises a converger, a distributor and at least two pipelines or pipeline loops between converger and distributor, has its own drainage container. Furthermore, the overall system is drained more rapidly when required owing to the larger number of drainage containers.

The above-described positioning of the drainage container has the further advantage that the salt melt in the supply lines to the main converger and main distributor, as far as their shut-off valves, can drain into the drainage container. When the shut-off valves are opened, the content of the main convergers and main distributors can additionally be drained into the drainage containers, but without the help of a driving pressure from the pressurized gas reservoirs.

Positioning of the pressurized gas reservoirs in the vicinity of the drainage containers, and therefore also in the vicinity of the main convergers and main distributors, is preferred. By virtue of this positioning, the length of the pressurized gas supply lines can be kept short.

So that the melt contained in the main converger and main distributor can also flow into the drainage containers, it is furthermore preferred for the main distributor and main converger also to be connected to the drainage container. The drainage container itself lies lower than all the pipelines in the pipeline system, that is to say lower than the main converger and main distributor, so that all of the liquid can flow into the drainage container. The connection of the main converger and/or main distributor to the drainage container may, for example, be formed using a bypass having a line branching from the converger or distributor and opening into the drainage container. As an alternative, it is also possible to provide a separate connecting line from the main converger and/or main distributor to the drainage container.

The pressurized gas may be fed into the converger or distributor, for example, from a pressurized gas reservoir which is connected to the converger or distributor, respectively. The connection is in this case carried out with a pressurized gas line, which opens from the pressurized gas reservoir into the converger or distributor, respectively. The length and diameter of the pressurized gas line are in this case preferably selected in such a way that an undesirably large pressure drop is avoided. In order to feed pressurized gas into the pipeline system only when drainage is desired, a venting valve, which opens when the pipeline system is intended to be drained, is provided in the pressurized gas line.

So that the liquid flows into the drainage container only when the pipeline system is intended to be drained, it is for example possible to provide a drainage valve in the connection from the converger or distributor, and if present in the connection from the main distributor or main converger, into the drainage container. The drainage valve opens when the pipeline system is intended to be drained.

In a particularly preferred embodiment, each drainage valve and each venting valve is a valve with a fail-safe function, which opens when a situation requiring drainage occurs, optionally with a delay. Such situations which require drainage are, for example, the occurrence of an elevated temperature or a reduced temperature in a pipeline loop, the occurrence of an elevated pressure or a reduced pressure in a pipeline loop, a deviation in the quantity flowing through a pipeline loop or an electrical outage. Furthermore, the drainage may also be instigated for example by automatic control, for example overnight drainage in ongoing operation or drainage when the solar insolation is not sufficient for the solar power station to be operable safely. Furthermore, drainage should also be possible by manual intervention.

The occurrence of an elevated or reduced temperature in a pipeline loop, or an insulation problem, may for example be localized rapidly by an infrared optical scanning system over the entire solar field. Such a scanning system may also, for example, trigger drainage of the pipeline system when values deviating from the norm are measured.

The drainage valves and venting valves used as valves with a fail-safe function are closed during normal operation of the solar power station. When drainage takes place, the valves are automatically opened. As a result of this, pressurized gas flows through the opened venting valve into the pipeline system and the liquid flows from the pipeline system through the opened drainage valve into the drainage container. The volume of the drainage container is to be selected to be large enough so that all the liquid located in the pipeline system to be drained, which is assigned to the drainage container, can be received.

In one embodiment, the venting valve is connected via a two-phase container. This affords the advantage of lower loading of the valves. Without the use of the two-phase container, the high temperatures of the pipeline system and a direct salt contact act on the valves. This can be avoided by way of the two-phase container, with the result that a longer service life and more reliable functioning of the valves can be ensured.

The pressure is limited by the pressure resistance of the connected pipelines and containers. In this case, the fact that the pressure in the pressurized gas reservoir decreases during the drainage process may be used when configuring the pressure strength of the containers and pipelines. An initial absolute pressure of from 5 to 30 bar is preferred. An absolute pressure in the range of from 10 to 20 bar is particularly preferred. The speed of the drainage may be controlled by flow limitation devices at the pressurized gas reservoir.

The pressurized gas used is preferably compressed air. If the pipeline system is a pipeline system in a solar power station, and a salt melt flows through it, pressurized air may be used when the salt melt contains no components which react chemically with constituents of air. A possible chemical reaction can be prevented by virtue of the fact that an air contact in the case of drainage is permitted only at a temperature which is so low that a possible chemical reaction can no longer take place kinetically. If the salt melt contains components which react chemically with constituents of air, then an inert gas, for example compressed nitrogen, may alternatively also be used as the pressurized gas. The inert gas may, of course, also be used when the salt melt contains no components which react chemically with constituents of air. In this case, however, the use of pressurized air is preferred. Furthermore, it is alternatively also possible to generate the pressurized gas in the pressurized gas reservoirs by compressing system gas which may be removed from the gas phase of the storage system, for example.

In addition to applying a pressurized gas to the pipeline system, it is also possible respectively to evacuate the drainage containers. In this case, when the venting valves are opened, the air pressure leads to accelerated drainage of the pipelines into the drainage container. Evacuation of the drainage container has the further advantage that rapid and reliable drainage is possible even when, for example owing to an electrical outage, pressurized gas is insufficiently available. Pressure-driven rapid drainage is in this case possible relative to ambient pressure when opening the venting valve to the surroundings.

In one embodiment of the invention, decentral pressurized gas reservoirs are respectively arranged in the vicinity of the venting valves. By using a pressurized gas reservoir, rapid and reliable drainage of a pipeline system is possible even when pressurized gas cannot be generated sufficiently, for example owing to an electrical outage. The pressure-volume of the pressurized gas reservoir is in this case preferably the volume of a gas-filled container multiplied by its gas pressure. Here, it must also be taken into account that the pressurized gas essentially assumes the pressure of the pipeline system when entering the latter. If the pipeline system to be drained is hotter than the pressurized gas in the pressurized gas reservoir, the pressure-volume is increased. This effect is substantially taken into account by introducing the pressure-temperature-volume. The pressure-temperature-volume is in this case the volume of a gas-filled container multiplied by its gas pressure and divided by the temperature in Kelvin.

Preferably, the pressurized gas reservoir has a pressure-temperature-volume which substantially corresponds to the pressure-temperature-volume of the pipeline system to be drained. This means that the pressure-temperature-volume of the pressurized gas reservoir deviates by at most 10% from the volume of the pipeline system. The flow resistance in the case of pressure-driven plug-like drainage of a uniform pipeline system is proportional to the wetted area of the pipeline. With increasing drainage, the wetted area of the pipeline decreases and the flow resistance is reduced. A constant driving pressure would result in an increasingly accelerated flow of the liquid with corresponding mechanical loads on the pipeline system. If, however, the driving pressure of a pressurized gas reservoir is used, then, with increasing drainage, gas flows out of the pressurized gas reservoir. Associated with this is a decreasing driving pressure in the pressurized gas reservoir, which, starting from the preferred pressure-volume in the pressurized gas reservoir, reaches the pressure value in the drainage container at the end of the drainage. The flow strength of the drainage is advantageously made uniform by this effect.

Different flow patterns result in a largely horizontal long pipeline depending on the applied gas pressure and the strength of a two-phase flow produced thereby in the pipeline. In the case of very high gas flows, caused by a high motive pressure, the two-phase flow comprising a gas phase and a liquid phase is substantially a plug flow, in which a gas cushion presses the liquid in front of it. In the case of a lower motive pressure, the flow pattern changes to a laminar flow, in which the gas flow is layered over the liquid flow. In the case of this flow pattern, the driving force of the pressurized gas on the liquid is reduced greatly in comparison with a plug flow. The remaining driving force still acts only via the friction of the rapidly flowing gas phase on the surface of the liquid phase.

It is very complicated in a solar field, however, to provide such a large quantity of pressurized gas that a plug flow can be maintained in the case of draining a long pipeline as far as complete draining. This problem is solved in one embodiment by virtue of the fact that a surge flow is generated. A surge flow can be generated, for example, by the pressurized gas acting in a pulsed manner on the liquid in a long horizontal pipe. Such a high pressurized gas flow density is achieved in a temporally and spatially limited manner by the application of pressurized gas pulses that the conditions for a plug flow are achieved in a temporally and spatially limited manner. The driving action of the pressurized gas on the liquid is improved decisively in this way.

Pressurized gas pulses can be generated, for example, by a pressurized gas reservoir being provided at the feed point for pressurized gas. The pressurized gas reservoir can be cyclically charged and emptied in the direction of the liquid-conducting pipeline by way of alternate opening of two valves on the pressurized gas reservoir. An alternative possibility consists in providing a phase separator between the pressurized gas reservoir and the pipeline to be emptied and periodically filling the gas volume of the phase separator rapidly from a pressurized gas reservoir and to await the pressure dissipation in the phase separator as a result of outflow in the direction of the long pipeline, until a pressure threshold triggers a renewed pressure surge as a result of charging of the phase separator.

Particularly preferably, first of all a maximum motive pressure within the system design is applied for complete draining of the pipeline system, and the liquid is therefore conveyed in the direction of the drainage container. As soon as the motive pressure reaches the drainage container or the decentralized pressurized gas reservoir is emptied, the pressure draining is stopped and the pipeline system is drained further without motive pressure. If the pressurized gas reservoir is re-charged with the aid of a pressurized gas generator, a further pressure draining can be started.

As an alternative, it is also possible to drain the pipeline system by pressure pulses being introduced which, however, lead only to partial draining. Here, the pressure pulses in each case have to be so strong and last at least so long that a liquid surge is generated in the pipeline.

Furthermore, both draining types can also be combined. Here, draining with a maximum motive pressure is preferably carried out first of all, until the motive pressure reaches the drainage container or the pressurized gas reservoir is drained and draining by way of the introduction of pressure pulses subsequently takes place.

The introduction of pressure pulses is suitable, in particular, for making drainage possible even in the case of slight local deviations of the pipeline from a horizontal or slightly falling course.

In the case of drainage, the pipeline loops are drained in parallel. Here, the pipeline loops with the lowest flow resistances are drained first. After pressurized gas penetrates into a pipeline loop, pressurized gas is preferably discharged through said line and is no longer available as propellant gas in other loops. Accordingly, the flow resistances in the pipelines is to be set up, for example by way of control valves or suitable acentric orifice plates, in such a way that sufficiently homogeneous drainage takes place. It is also possible to close valves in the drained line after penetration, in order to prevent gas breakthroughs through the pipeline which has already been drained.

In order to avoid plugs being formed in colder regions of the pipeline system owing to solidifying salt melt, which can be detached during the drainage and are entrained, and can therefore cause damage in the pipeline system, in one embodiment of the invention all the pipeline system components through which the liquid flows are kept at a high temperature conducive to drainage. This, however, has the disadvantage that a large amount of energy, for example electrical energy, is required in order to maintain the temperature. The lines of a solar field, as well as the lines to distributors and convergers, are hot during operation and, with sufficient thermal insulation, are also reliably capable of drainage. Colder regions of the pipeline system, however, are for example drainage lines which are empty during operation and connect the pipeline system to the drainage container. When the salt melt is delivered into the cold drainage line, the salt solidifies and the aforementioned plugs which unacceptably hinder the flow are formed. This risk increases with the length of the pipeline and decreases with the size of its cross section.

Besides continuous heating, it is also possible and preferred to heat the drainage components only when the drainage is intended to be initiated. This avoids the permanent energy outlay for heating the drainage components. In this case, however, drainage of the pipeline system is possible only with a delay, namely after the heating time. In the event of an energy outage, the risk of melt solidifying in the pipeline system to be drained increases in this case.

Heating of the drainage valves is particularly problematic, since they are usually equipped with a greater wall thickness than the connected pipelines. This, on the one hand, has the effect that valves have a high heat capacity, and accordingly a great deal of energy must be put in for the heating in order to achieve the drainage temperature. On the other hand, the area through which heat can be introduced is specifically very small. It is also to be noted that excessively large temperature differences in the valve body can cause mechanical damage. The effect of this is that the heating times of the valves are particularly long. The heating times can be avoided by heating the valves continuously.

It is furthermore possible to introduce an internal heating conductor into the drainage line for the heating. Heating with an internal heating conductor significantly reduces the length of time for heating until suitability for drainage. This time saving is achieved particularly by the heat capacity of an internal heating conductor being much less than that of a pipeline, so that less heat needs to be applied in order to achieve the drainage temperature.

The internal heating conductor is preferably routed as far as and into the drainage container. Furthermore, the internal heating conductor is preferably configured in such a way that it comprises internally lying channels, in which molten salt accumulates and can be removed. The channels may, for example, be formed by twisting (stranding) at least three electrical heating conductors around one another. In the middle of the stranding, gaps are formed which are suitable as channels in the context of the invention.

A drainage container, suitable for drainage of the pipeline system, for receiving a liquid flowing through a pipeline system, is connected to the pipeline system via an immersion pipe projecting into the drainage container, a siphon being formed in the immersion pipe, between the pipeline system and the drainage container, and the immersion pipe being heatable, the siphon being closed by a plug of solidified material during operation of the pipeline system.

In the context of the present invention, a siphon is intended to mean not only an s-shaped or u-shaped siphon, but also an unbent region of a pipeline, in which material can solidify so that the pipeline is closed by the solidified material.

The siphon closed by the solidified material in this case fulfills the function of the drainage valve. The siphon is heatable, preferably by an internal heating conductor, and as soon as drainage is imminent the siphon is heated, so that the material contained in the siphon melts and the path into the drainage container is thus cleared. By using the internal heating conductor, the material contained in the siphon can be heated rapidly, and melted to such an extent that the liquid can flow from the pipeline system through the siphon into the drainage container.

Salt plugs consisting of nitrate mixtures have high melting volumes and are very hard. In the event of unsuitable melting, this can lead to a high local pressure on a surrounding pipeline system and overextension thereof. The tolerance of the siphon structure to local expansion can be increased by shaping the surrounding pipeline. For example, in the region in which the material solidifies and the plug forms, the cross section of the pipeline can be configured in a star shape. More simply, as an alternative, the pipeline may be provided with significant ovality, for example 25%, in the region in which the plug forms.

In the region of the siphon, the internal heating conductor is preferably configured in such a way that it can emit an increased heating power, in order to adapt the heating power to the melting enthalpy required. This may, for example, be achieved by equipping the internal heating conductor with its own heating element, which can be switched on, at the position of the siphon.

As an alternative, the heating conductor may be concentrated in the region of the siphon, for example in the form of a coil. The internal heating conductor furthermore has the function of mechanically stabilizing the solidified material contained in the siphon. This function may, for example, be generated well by shaping the internal heating conductor in a coil, optionally having a plurality of layers. The effect of the mechanical stabilization achieved in this way for the solidified material contained in the siphon is that large pieces of melt cannot be detached and cause mechanical damage in the event of flow.

In the siphon, material can solidify by a melt-filled drainage line remaining unheated without flow in the region of the siphon. In this case, a possibly existing system pressure can be compensated for by applying a stabilizing backpressure in the drainage container until solidification. The melt cools and, when it falls below the solidification temperature, the siphon is closed by solidified material. As an alternative or in addition, in order to promote the solidification, it is also possible to equip the siphon with insulation temporarily reduced in comparison with the rest of the insulation. As an alternative, controlled cooling in the region of the siphon is also possible.

The siphon is positioned in such a way that it lies close enough to the hot pipeline system in order to be heated by thermal transmission, and on the other hand it lies far enough away in order, by thermal transmission to the cold surroundings, to reach a temperature which is low enough in order to obtain the solidified material in a mechanically stable and sealing fashion. Continuous preheating of the solidified material leads to the desired short melting times.

By means of the immersion pipe, an increased hydrostatic level is achieved, which leads to a reduction in the drainage times of the pipeline system. Another advantage of the immersion pipe is that it can also be used for refilling the pipeline system, by pressing the liquid from the drainage container into the immersion pipe. As an alternative or in addition, an immersion pump may be installed in the drainage container, by which the liquid is conveyed from the drainage container into the pipeline system or the main converger or main distributor.

In order to avoid salt melt solidifying in the initially cold immersion pipe, particularly at the start of the drainage process, the immersion pipe preferably contains a heating conductor for heating. The heating conductor preferably comprises channels as described above, through which liquid melting during the heating can flow away.

In addition to draining, filling of the pipeline system is also indispensable for efficient operation. Here, the filling can be carried out in such a way that pressurized gas is introduced into the drainage container, which pressurized gas presses the liquid through the immersion pipe back into the pipeline system again. As an alternative, it is also possible to convey the liquid back into the pipeline system with the aid of a pump. The liquid which penetrates into the pipeline system from below displaces the gases which are contained in the pipeline system. The displaced gases can leave the pipeline system via the opened venting valve.

In one embodiment, a T-piece is arranged at the highest point of the pipeline system, the branch of which T-piece opens into a two-phase container which is positioned above the pipeline system. Said two-phase container can contain a filling-level measurement means for phase detection, for example in the form of a vibrating limit switch. The completeness of the filling of the pipeline system can be detected in the filling process by way of the filling-level measurement means. As soon as liquid enters into the two-phase container and the liquid level rises, the filling is concluded. If an associated phase limit switch is triggered, the venting valve is closed and the filling operation is thus stopped.

Together with actuators for the venting valve and the ventilation valve, the filling-level measurement means can be incorporated into a filling-level control means.

The two-phase container is usually arranged in a side branch of the pipeline system, with the result that this is also not flowed through during the flow through the pipeline. In the case of a sufficiently great spacing, the temperature of the two-phase container is decoupled from the temperature of the pipeline system. The two-phase container can then be heated in a targeted manner to a temperature only just above the solidification temperature of the melt which is guided through the pipeline system, independently of the temperature in the pipeline system. Since measurement systems are virtually unavailable for the use temperatures in the pipeline system which can be up to 550° C., the two-phase container also permits the use of measurement systems, the temperature resistance of which lies considerably lower than 550° C. In addition to the filling-level measurement, a pressure measurement or a temperature measurement can thus also be carried out in the two-phase container.

In order to improve the temperature decoupling of pipeline system and two-phase container, it is possible to connect a convection brake in between. A convection brake of this type can be designed, for example, in the form of a siphon. As an alternative, the convection brake can also be realized by virtue of the fact that the branch to the two-phase container is designed with a downwardly leading line.

As has been described above for the drainage container, the siphon can also be closed with a plug of solidified material. This has the advantage that the two-phase container does not have to be heated. Furthermore, the outlay is dispensed with for feeding in pressurized gas in order to operate the optional filling-level control means. Before draining, the plug can be melted, for example, by means of an internal heating conductor with a melt duct on the inside for releasing the venting. In addition, the region of the siphon can be protected against pipeline over-expansion by way of the plug made from solidified material, as described above for the siphon on the drainage container.

Exemplary embodiments of the invention are represented in the figures and will be explained in more detail in the description below.

FIG. 1 represents a detail of a solar field of a solar power station.

Figure 1:
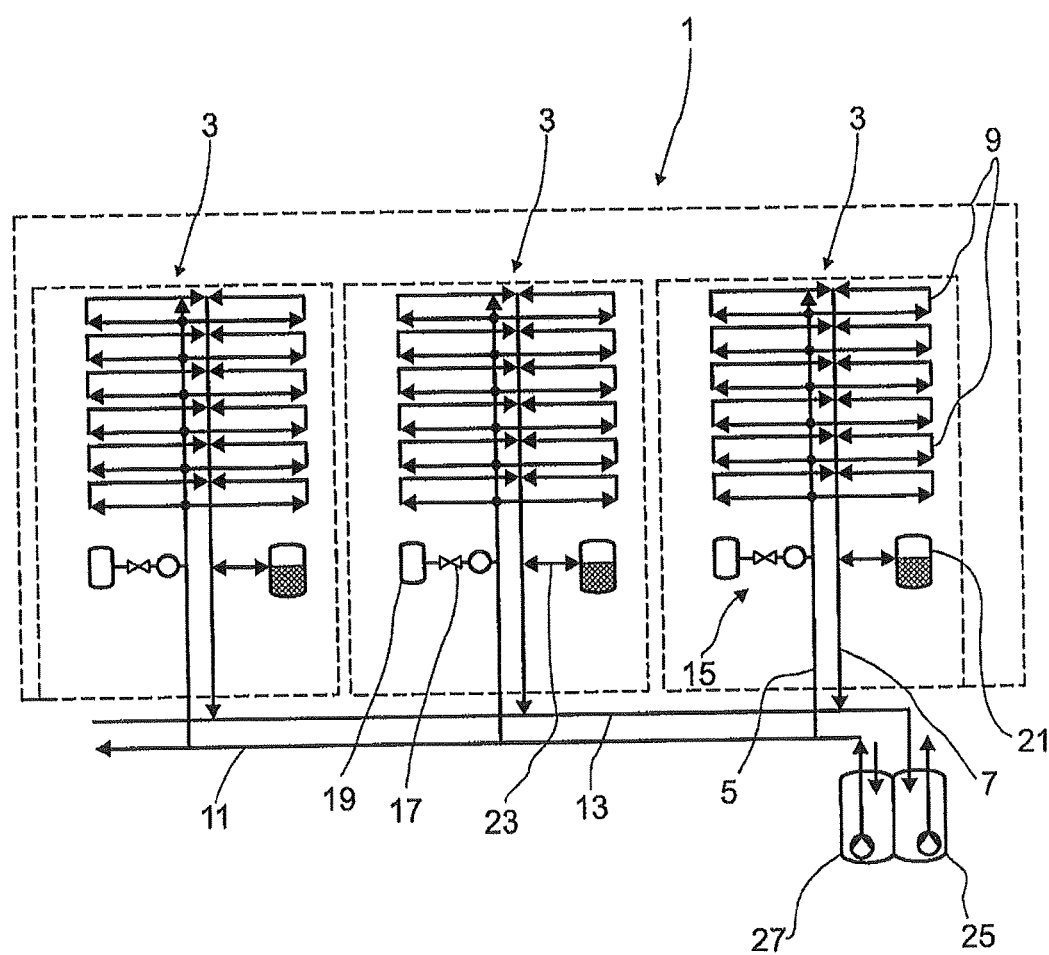
FIG. 1 shows a detail of a solar field of a solar power station.

A solar field 1 of a solar power station conventionally comprises a plurality of pipeline systems 3, each of which comprises a distributor 5, a converger 7 and at least two pipeline loops 9. The distributors 5 of a plurality of pipeline systems 3, preferably of all the pipeline systems 3, are connected to a main distributor 11. Furthermore, the convergers 7 of a plurality of pipeline systems 3, preferably of all the pipeline systems 3, are connected to a main converger 13.

In order to permit rapid drainage of the individual pipeline systems 3 when required, in the embodiment represented here each converger 7 is connected to a pressurized gas feed 15. The pressurized gas feed 15 comprises a venting valve 17 and a pressurized gas reservoir 19. During normal operation of the solar power station 1, the venting valve 17 is closed. As soon as drainage is necessary, the venting valve 17 is opened.

A ventilation valve (not shown here) and the venting valve 17 may be connected to the converger 7 via a two-phase container.

In order to receive the liquid flowing in the pipeline system 3 during drainage, usually a salt melt, the converger 7 is connected to a drainage container 21. In order to close the drainage container 21 during normal operation of the solar power station 1, it is possible to provide a drainage valve (not represented here) in a drainage line 23 by which the drainage container 21 is connected to the converger 7. The drainage valve is closed during normal operation of the solar power station 1, and is opened as soon as drainage is necessary.

So that the content of the entire pipeline system 3 can flow into the drainage container 21 in the event of necessary drainage, it is preferred for the pressurized gas feed 15 to be arranged between the main distributor 11 and the first pipeline loop 9 of the pipeline system 3. Correspondingly, the drainage container 21 is positioned between the main converger 13 and the opening of the last pipeline loop into the converger 7. When pressurized gas is applied to it after the venting valve 17 is opened, the liquid is thus pressed from the distributor 5 into the pipeline loops 9, and from the latter into the converger 7. From the converger 7, the liquid then passes through the opened drainage valve into the drainage container 21. The drainage takes place after closing outlet valves and inlet valves (neither represented here). These are arranged between the distributor 5 and the main distributor 11, and between the converger 7 and the main converger 13, respectively.

In order to reintroduce the liquid into the pipeline system 21 when starting operation again, the process is reversed and the liquid flows, with a closed outlet valve and inlet valve, from the drainage container 21 through the converger 7 into the pipeline loops 9, and is pressed therefrom into the distributor 5.

Figure 2:
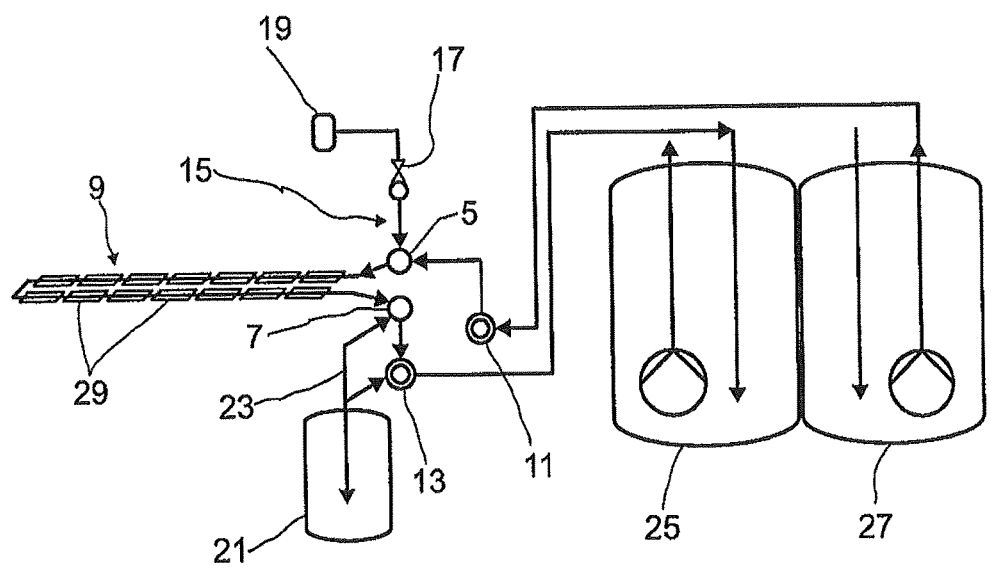
FIG. 2 shows a part of a pipeline system comprising a pipe loop in a solar power station.

During ongoing operation of the solar power station, heat transfer liquid, usually a salt melt, is delivered from a cold storage container 27 into the main distributor 11. To this end, for example, it is possible to provide an immersion pipe, through which the heat transfer liquid is removed, in the cold storage container 27. The distributors 5 branch from the main distributor 11, so that the heat transfer liquid flows from the main distributor 11 into the distributors 5 of the individual pipeline systems 3. From the distributors 5, the heat transfer liquid flows into the pipeline loops 9, in which the heat transfer liquid is heated by solar insolation in collectors 29, which are schematically represented in FIG. 2. The heated heat transfer liquid flows into the converger 7, into which the pipeline loops 9 open. The convergers 9 of the pipeline systems 3 open in the main converger 13, through which the heated heat transfer liquid is delivered into the storage container 25.

In order to generate electricity, the heated heat transfer liquid from the reservoir 25 is used to generate steam. The steam in turn drives a generator for generating electrical energy. By the generation of steam, the heat transfer liquid releases heat and becomes cooler. The cooled heat transfer liquid is then fed into the cold storage container 27.

By using the heat transfer liquid and the storage containers 25, 27, it is possible to heat such a large amount of heat transfer liquid that it can still be used for steam generation even when no solar insolation is taking place.

As an alternative to the variant represented here, with a cold storage container 27 and a storage container 25 for the heated heat transfer liquid, it is also possible, for example, to use a stratified storage tank which contains the heated heat transfer liquid above and the cold heat transfer liquid below. Correspondingly, as required, the hot heat transfer liquid is taken from above and the cold heat transfer liquid is supplied below, respectively.

A part of a pipeline system comprising a pipe loop is represented by way of example in FIG. 2.

FIG. 2 shows, in particular, the arrangement of the distributor 5, converger 7, main distributor 11 and main converger 13. According to the invention, the distributor 5 is arranged above the converger 7. This leads to a slight gradient in the pipeline loops 9, which facilitates the transport of the heat transfer liquid through the pipeline loop 9 in the direction of the converger 7. A drainage line 23, which opens in the drainage container 21, branches from the converger 7. The pipeline system 3 can be drained into the drainage container 21 through the drainage line.

In order to ensure reliable drainage of the pipeline system 3 even in the event of an energy outage, the drainage container is arranged lower than all the pipelines, that is to say also lower than the distributor 5, converger 7, main distributor 11 and main converger 13. Here, "arranged lower" means that even when the drainage container 21 is fully filled the liquid level in the drainage container 21 lies lower than the lowermost pipeline, in the embodiment represented here the main converger 13.

The pressurized air feed 15 is located at the highest point of the pipeline system 3, in the embodiment represented here above the distributor 5, and opens into the distributor 5. In this way, during drainage by pressurized gas flowing in, the transport of the heat transfer liquid through the pipeline system 3 is assisted according to the force of gravity acting on the heat transfer liquid.

In order to drain the main converger 13 and main distributor 11 as well in the event of drainage, it is preferred for a line from the main converger 13 and/or the main distributor 11 to open into the drainage container 21. Thus, the heat transfer liquid contained in the main converger 13 and/or the main distributor 11 can also flow into the drainage container 21.

As an alternative to the embodiment represented in FIG. 2, in which the distributor 5 lies higher than the converger 7, it is also possible to position the converger 7 higher than the distributor 5 and/or the main converger 13 higher than the main distributor 11.

Figure 3:
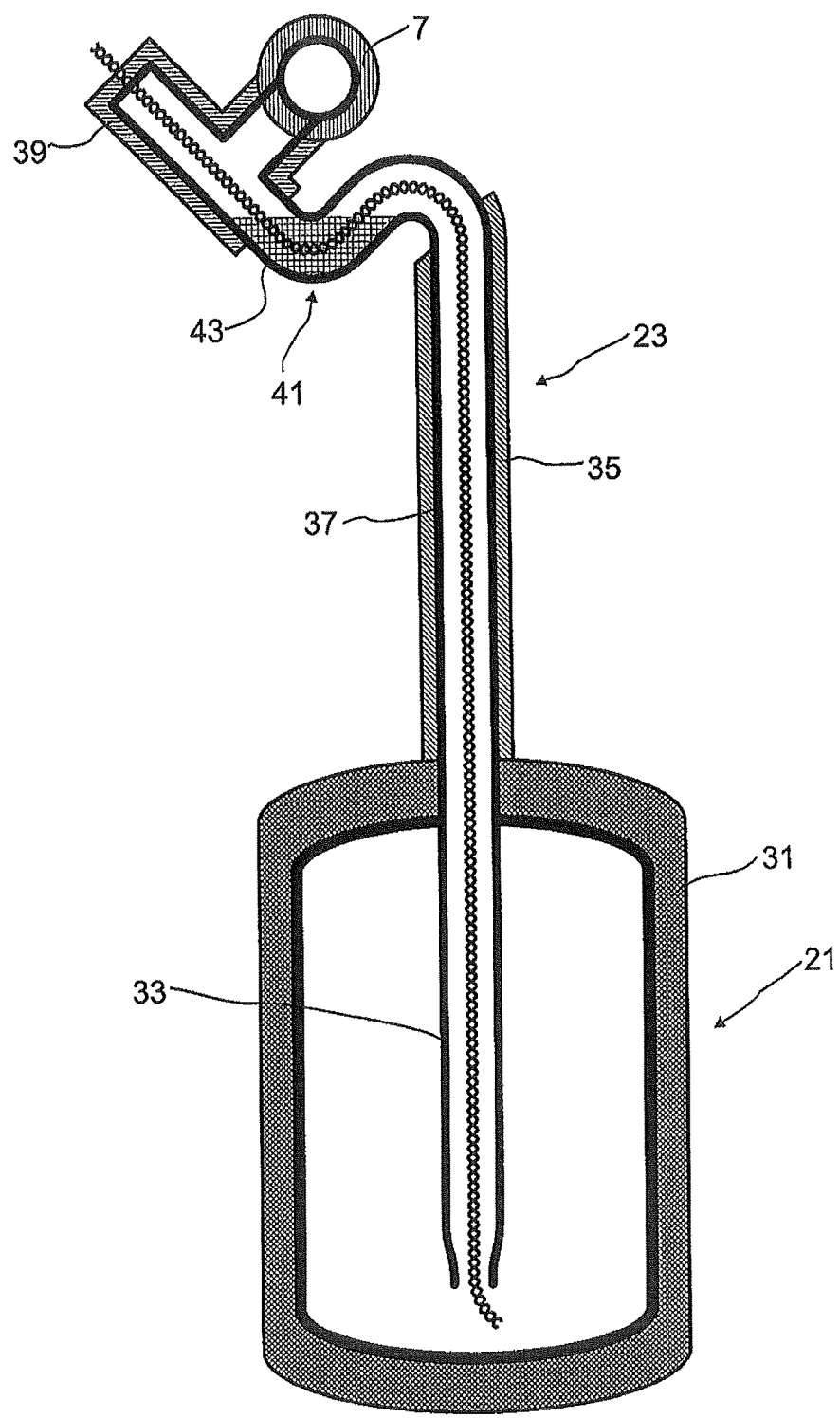
FIG. 3 shows a drainage container comprising an immersion pipe and a siphon.

An advantageous configuration of a drainage container 21 is represented in FIG. 3.

So that the salt melt does not solidify immediately after drainage of the pipeline system 3, it is preferred to provide the drainage container 21 with thermal insulation 31. The drainage line 23, through which the pipeline system 3 can be drained into the drainage container 21, opens into the drainage container 21 in the form of an immersion line 33. This makes it possible to refill the pipeline system 3 from the drainage container 21 through the immersion pipe 33, when operation of the solar power station is resumed again. So that the heat transfer liquid does not solidify in the drainage line 23 during drainage, this line is likewise provided with thermal insulation 35. In addition, it is preferred for the drainage line 23 to be heatable. To this end, in the embodiment represented here, an internal heating conductor 37 which extends inside the drainage line 23 is provided. The internal heating conductor 37 is in this case introduced into the drainage line through a blind flange 39. In order to prevent solidification of the salt melt in the drainage line 23 formed as an immersion pipe 33, it is particularly preferred to route the internal heating conductor 37 through the entire drainage line 23, so that the drainage line 23 can be heated along its entire length.

As an alternative to an internal heating conductor, any other pipe heating may of course also be used for the drainage line 23. For example, an insulated heating conductor bearing internally or externally on the pipe wall of the drainage line 23 may be used, or the pipeline itself contains an electrically conductive material so that the pipe wall can be heated directly. An internal heating conductor 37 is, however, preferred.

In order to close the drainage container 21 during ongoing operation of the solar power station, it is possible to provide a drainage valve in the drainage line 23. It is however preferred, as represented in FIG. 3, to provide the drainage line 23 with a siphon 41, the siphon preferably being less well thermally insulated, or not thermally insulated. Owing to the lack or reduction of thermal insulation, the pipeline is cold in the region of the siphon so that the salt melt solidifies in the siphon. A plug 43 of solidified material is thereby formed, and closes the discharge line from the pipeline system 3 so that no salt melt can flow into the drainage container 21 during ongoing operation.

When drainage is necessary, the solidified material of the plug 43 is melted and the passage into the drainage container 21 is thereby opened. In order to melt the solidified material of the plug 43, the drainage line 23 is heated at least in the region of the siphon 41. It is particularly preferred to carry out the heating with the internal heating conductor 37, the internal heating conductor 37 also being routed through the plug 43 of solidified material.

The internal heating conductor preferably comprises internally lying channels, through which the material directly enclosing the internal heating conductor, which is therefore the material melted first, can already flow a short time after the start of the heating. In this way, a flow channel is generated, through which the salt melt can flow into the drainage container 21. The melting of the solidified material forming the plug 43 is accelerated by contact with the hot salt melt, and the flow cross section is consequently further increased rapidly.

In order to close the drainage line 23 in the region of the siphon 41, besides the absence of thermal insulation as represented here, controlled cooling is also possible as an alternative or in addition. To this end, for example, cooling coils, through which a coolant for cooling is fed, may be laid around the siphon. An internally lying cooling coil in the region of the siphon may also be envisioned. If additional cooling which is carried out using a coolant is provided, then in the event of necessary drainage it is thus also possible to pass a heat transfer medium through the cooling coils and thus provide an additional heat source. It is, however, preferred merely to cool for generating the plug 43 of solidified material and subsequently have no further cooling.

In order to permit melting of the solidified material forming the plug 43, particularly in the event of an energy outage which necessitates drainage, it is particularly preferred for the internal heating conductor 37 to be powered from an independent energy supply. Even in the event of a general energy outage, the latter can then provide sufficient electrical energy for heating the drainage line 23. The independent energy supply may, for example, be produced by an emergency electricity generating unit or optionally by a rechargeable battery.

Figure 4:
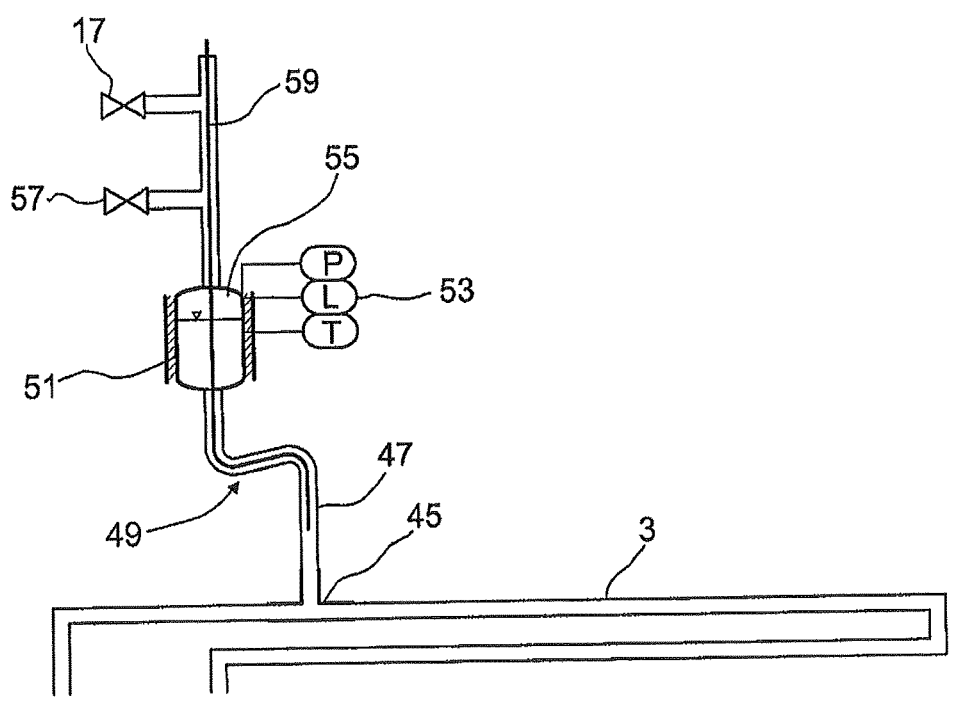
FIG. 4 shows a part of a pipeline system having a two-phase container.

FIG. 4 shows a part of a pipeline system having a two-phase container.

In the embodiment which is shown in FIG. 4, a branch 47 to the pipeline system 3 is arranged at the highest point via a T-piece 45. A two-phase container 51 is connected to the branch 47 via a siphon 49 for temperature decoupling. Temperature-sensitive measurement systems, for example for measuring filling level, temperature and pressure, can be connected to the two-phase container.

A temporal end point can be detected by way of a filling-level measurement system 53, for example, during the filling process of the pipeline system 3. The pipeline system is thus filled completely when the flow level in the two-phase container 51 increases.

At least one venting valve 17 is arranged at the gas space 55 of the two-phase container 51. In addition, a separate ventilation valve 57 can also be provided. In the arrangement which is shown here, the venting valve 17 and the ventilation valve 57 do not have any contact with the heat exchange medium which is used, for example the salt melt, and, on account of the temperature decoupling which makes it possible to keep the two-phase container 51 at a temperature only just above the solidification temperature of the heat exchange medium, are exposed also only to this temperature, as a result of which the service life of the valves 17, 57 can be increased significantly.

The heating of the two-phase container 51 can be realized particularly efficiently by way of an internal heating conductor 59. Here, the internal heating conductor 59 preferably has inner melt ducts, for example in the form of a groove which runs in the axial direction, or by the internal heating conductor being configured as a hollow body with radial openings. It is also possible to realize the melt ducts, by an internal heating conductor in the form of a knitted fabric or a twisted rope being used.

The internal heating conductor 59 preferably extends as far as into the siphon 49. This allows heat exchange medium to solidify in the siphon, to form a plug and to close the siphon in this way. If required, for example if the pipeline system 3 is to be drained, the plug of solidified heat exchange medium can be melted by means of the internal heating conductor 59, with the result that the siphon 51 is released for throughflow with gas via the venting valve 17 through the two-phase container 51 and the siphon 49 into the pipeline system 3.

Figure 5:
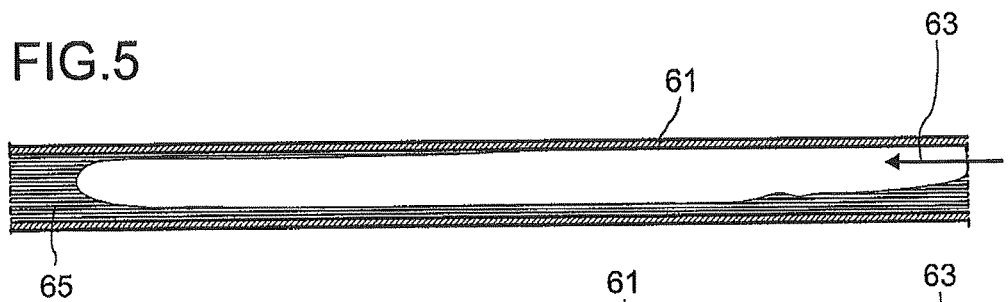
FIG. 5 shows a pipe piece with a plug flow.

FIG. 5 shows a plug flow, as can be adjusted if gas flows with a high motive pressure through the pipeline system 3.

In the detail shown here of a pipeline system 3, propellant gas 63 enters from the right. The propellant gas 63 displaces a large part of the liquid 65 which is contained in the pipeline system 3 in the form of a plug which is pushed in front of the propellant gas 63.

Figure 6:
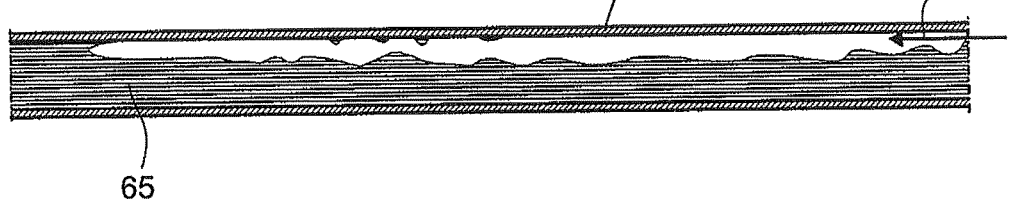
FIG. 6 shows a pipe piece with a laminar flow.

FIG. 6 shows a laminar flow which is adjusted at a low pressure of the propellant gas.

Here too, the propellant gas 63 enters from the left into the part piece which is shown of a pipeline system. 3. On account of the low pressure, however, the propellant gas 63 is not capable of pushing the entire liquid 65 in the form of a plug in front of it. A laminar flow is produced, in which the propellant gas 63 displaces the liquid 65 in the upper part and the liquid 65 remains in the pipeline in the lower part. Liquid transport takes place only by way of friction of the propellant gas 63 on the surface of the liquid 65.

Figure 7:
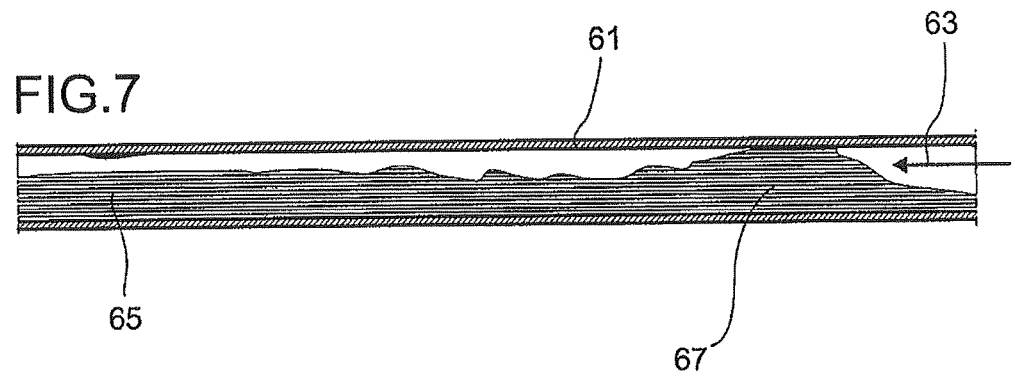
FIG. 7 shows a pipe piece with a surge flow.

FIG. 7 shows a surge flow, as can be achieved by way of pressure pulses with the propellant gas 63. A liquid surge 67 which is conveyed through the pipeline system by the pressure of the propellant gas is generated here by way of pressure pulses with the propellant gas 63.

Figure 8:
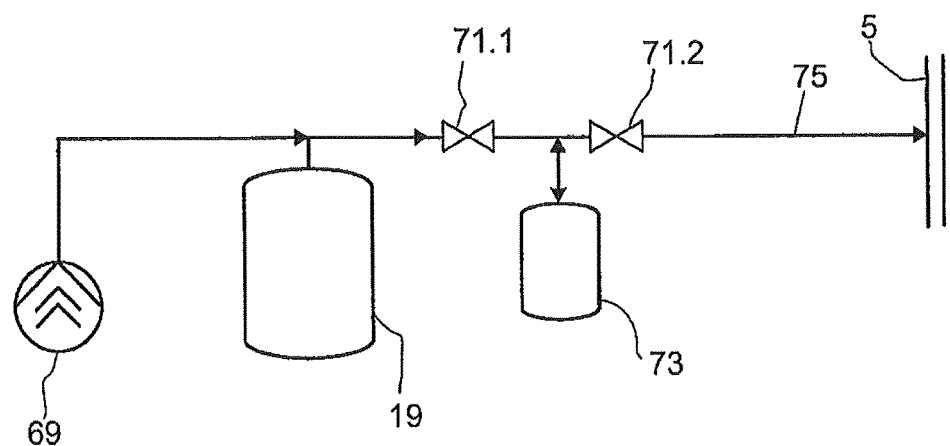
FIG. 8 shows a part of a pipeline system with a device for generating pressure pulses.

FIG. 8 shows a possible device by way of example, by way of which device pressure pulses can be generated.

In the device which is shown in FIG. 8 for generating pressure pulses, pressurized gas is introduced continuously into a decentralized pressurized gas reservoir 19 by means of a pressurized gas generator 69, for example a compressor. From the pressurized gas reservoir 19, by way of two valves 71.1, 71.2 which switch alternately, gas is guided from the decentralized pressurized gas reservoir 19 into a buffer reservoir 73 in the case of an open first valve 71.1 and a closed second valve 71.2. Subsequently, the first valve 71.1 closes and the second valve 71.2 opens. As a result, the gas flows from the buffer reservoir 73 through a pipeline 75 into the distributor 5 of the pipeline system 3 (not shown here).

Figure 9:
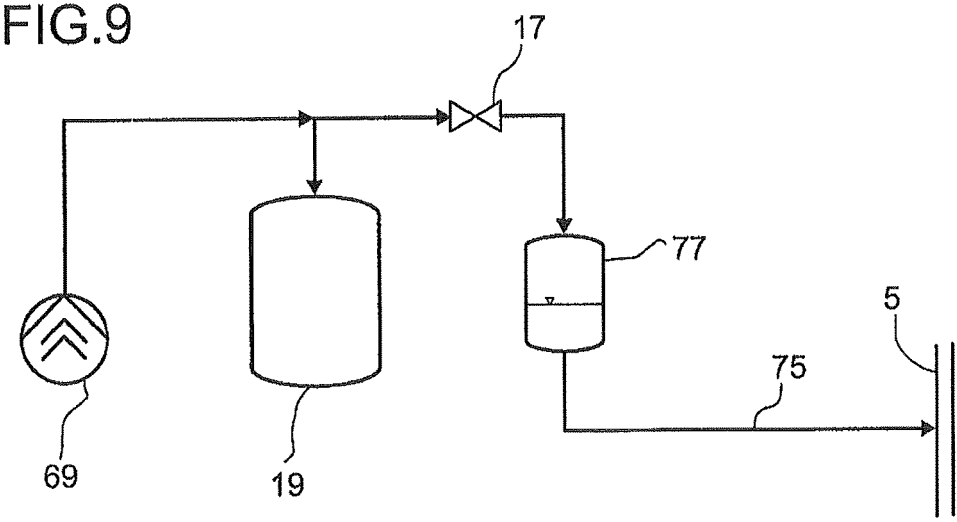
FIG. 9 shows a part of a pipeline system with a device for generating pressure pulses in an alternative embodiment.

FIG. 9 shows an alternative embodiment of an device for generating pressure pulses.

In the embodiment which is shown in FIG. 9, pressurized gas is introduced continuously into the decentralized pressurized gas reservoir 19 by way of a pressurized gas generator 69. Pressure pulses are introduced into the pipeline system 3 to be drained from the pressurized gas reservoir 19 by way of a venting valve 17 with the utilization of a phase separator 77, the buffer function of which is utilized. To this end, the device which is shown in FIG. 9 is likewise preferably connected to the distributor 5 of the pipeline system 3.

If the pressure pulses are to be fed in with the utilization of the phase separator 77, it is advantageous if the pipeline 79 from the pressurized-air reservoir 19 to the phase separator 77 has a considerably lower flow resistance than the pipeline system 3 and the pipeline 81 from the pressurized gas generator 69 to the decentralized pressure reservoir 19.

LIST OF REFERENCES 1 solar field
3 pipeline system
5 distributor
7 converger
9 pipeline loop
11 main distributor
13 main converger
15 pressurized gas feed
17 venting valve
19 pressurized gas reservoir
21 drainage container
23 drainage line
25 storage container
27 cold storage container
29 collector
31 thermal insulation
33 immersion pipe
35 thermal insulation
37 internal heating conductor
39 blind flange
41 siphon
43 plug of solidified material
45 T-piece
47 branch
49 siphon
51 two-phase container
53 filling-level measurement system
55 gas space
57 ventilation valve
59 internal heat conductor
61 pipe piece
63 propellant gas
65 liquid
67 liquid surge
69 pressurized gas generator
71.1 first valve
71.2 second valve
73 buffer reservoir
75 pipeline
77 phase separator

The invention claimed is:

1. A pipeline system in a linearly concentrating solar power station, comprising at least one pipeline (9) which is connected at one end to a converger (7) and at a second end to a distributor (5), wherein the converger (7) and the distributor (5) are arranged at a different geodetic height, and when the converger (7) lies on top pressurized gas can be fed into the converger (7) and the distributor (5) is connected to a drainage container (21), and when the distributor (5) lies on top pressurized gas can be fed into the distributor (5) and the converger (7) is connected to a drainage container (21), the drainage container (21) lying lower than the converger (7) and the distributor (5), and wherein the drainage container (21) is connected to the pipeline system (3) via an immersion pipe (33) projecting into the drainage container (21).

2. The pipeline system according to claim 1, wherein the converger (7) and the distributor (5) are respectively configured in the form of a pipeline, and the at least one pipeline comprises a plurality of pipelines (9) which are connected at one end to the converger (7) and at the other end to the distributor (5), respectively branch with one end from the converger (7) and with the other end from the distributor (5).

3. The pipeline system according to claim 1, wherein the converger (7) and the distributor (5) are connected to one another at one end, so that liquid which does not flow from the distributor (5) into the at least one pipeline (9) is conveyed at the end of the distributor (5) into the converger (7).

4. The pipeline system according to claim 1, wherein the at least one pipeline comprises a plurality of pipelines (9), the pipeline system (3) comprises a plurality of convergers (7) and distributors (5), which are respectively connected to the plurality of pipelines (9), all the convergers (7) being connected to a main converger (13) and all the distributors (5) being connected to a main distributor (11).

5. The pipeline system according to claim 4, wherein a plurality of drainage containers (21) are respectively positioned between the main converger (13) and a first branching pipeline (9) when the distributor (5) lies on top, or positioned between the main distributor (11) and a first branching pipeline (9) when the converger (7) lies on top.

6. The pipeline system according to claim 4, wherein a pressurized gas feed (15) is respectively positioned between the main converger (13) and a first branching pipeline (9) when the converger (7) lies on top, or between the main distributor (11) and a first branching pipeline (9) when the distributor (5) lies on top.

7. The pipeline system according to claim 4, wherein the drainage container (21) lies lower than the main distributor (11) and the main converger (13), and the main distributor (11) and/or the main converger (13) are connected to the drainage container (21).

8. The pipeline system according to claim 1, wherein the pressurized gas is fed in from a pressurized gas reservoir (19) which is connected to the converger (7) or distributor (5), respectively.

9. The pipeline system according to claim 8, wherein the pressurized gas is compressed air or compressed nitrogen or compressed system gas.

10. The pipeline system according to claim 8, wherein the pressurized gas is obtained by compression of the gaseous phase of a heat storage system.

11. The pipeline system according to claim 1, wherein a phase separator (77) is received between a pressurized gas reservoir (19) and the converger (7) or distributor (9).

12. The pipeline system according to claim 1, wherein a siphon (41) is formed in the immersion pipe (33), between the pipeline system (3) and the drainage container (21), and the immersion pipe (33) is heatable, the siphon (41) being closed by solidified material (43) during operation of the pipeline system (3).

13. The pipeline system according to claim 12, wherein the siphon is formed by a pipeline, the cross section of which is shaped in such a way that the pipeline forming the siphon is tolerant to local expansions during the process of melting the solidified material.

14. The pipeline system according to claim 12, wherein the immersion pipe (33) contains an internal heating conductor (37) for the heating.

15. The pipeline system according to claim 14, wherein the internal heating conductor (37) comprises channels, through which liquid melting during the heating can flow away.

16. A pipeline system comprising at least one pipeline (9) which is connected at one end to a converger (7) and at a second end to a distributor (5), wherein the converger (7) and the distributor (5) are arranged at a different geodetic height, and when the converger (7) lies on top pressurized gas can be fed into the converger and the distributor (5) is connected to a drainage container (27), and when the distributor (5) lies on top pressurized gas can be fed into the distributor (5) and the converger (7) is connected to a drainage container (21), the drainage container (21) lying lower than the converger (7) and the distributor (5), wherein two valves (71.1, 71.2) which switch alternately and a buffer container (73) between the valves (71.1, 71.2) are received between a pressurized gas container (19) and the converger (7) or distributor (9).

17. A pipeline system in a linearly concentrating solar power station, comprising at least one pipeline (9) which is connected at one end to a converger (7) and at a second end to a distributor (5), wherein the converger (7) and the distributor (5) are arranged at a different geodetic height, and when the converger (7) lies on top pressurized gas can be fed into the converger (7) and the distributor (5) is connected to a drainage container (21), and when the distributor (5) lies on top pressurized gas can be fed into the distributor (5) and the converger (7) is connected to a drainage container (21), the drainage container (21) lying lower than the converger (7) and the distributor (5), wherein a two-phase container (51) is connected via a siphon (49) to the highest point of the pipeline system (3), a gas space of the two-phase container (51) being connected to a venting valve (17).

* * * * *